Dec. 26, 1933. J. H. NASH 1,940,965
WATER SOFTENING APPARATUS
Filed April 24, 1931
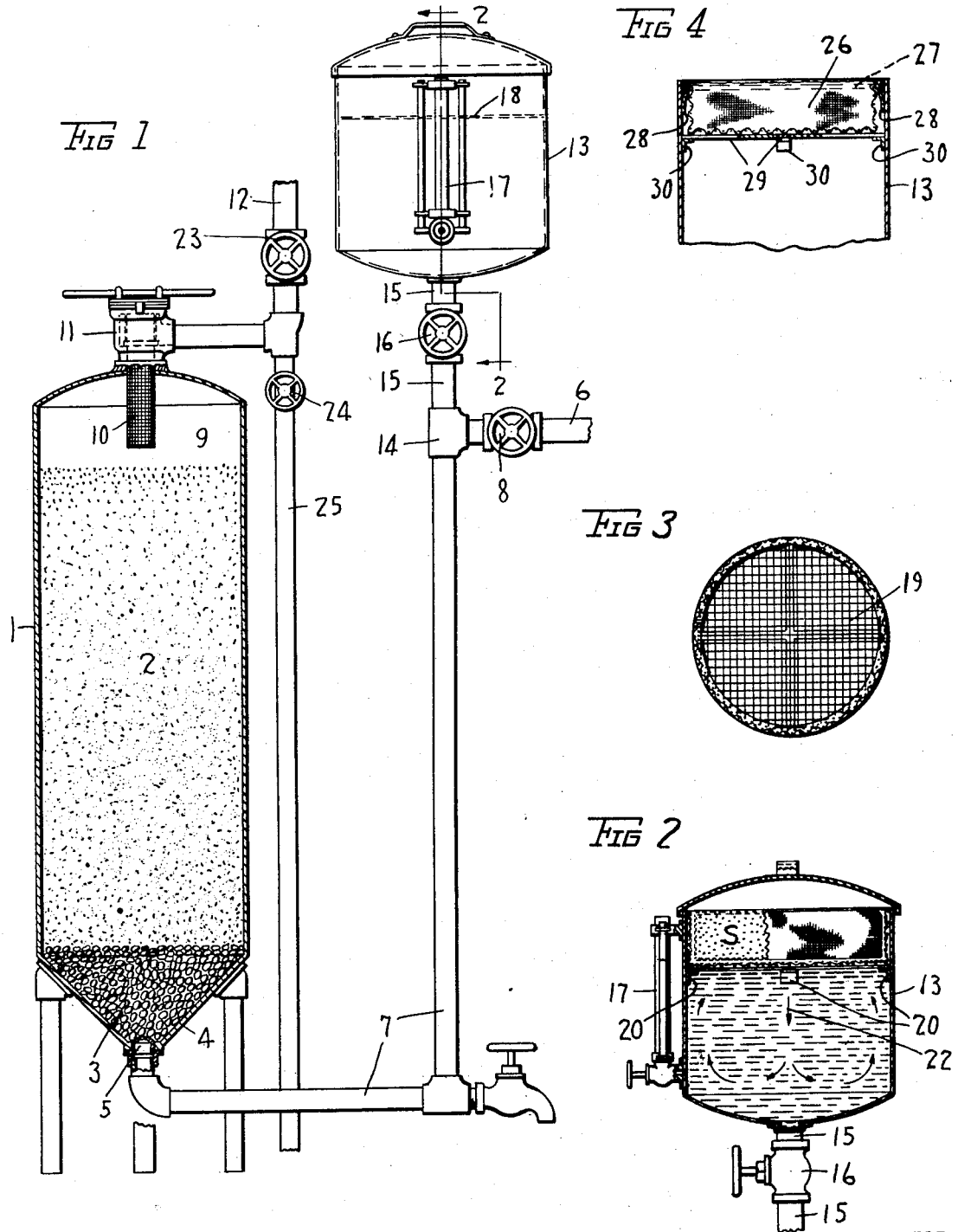
INVENTOR
John H. Nash
BY Staley & Welch
ATTORNEYS Patented Dec. 26, 1933

1,940,965

UNITED STATES PATENT OFFICE 1,940,965

WATER SOFTENING APPARATUS

John H. Nash, Dayton, Ohio

Application April 24, 1931. Serial No. 532,460

3 Claims. (Cl. 210—24)

This invention relates to improvements in base exchange water softeners, it more particularly relating to improvements in the means of and apparatus employed in the preparation of a completely saturated brine solution, the brine being employed in renewing the activity of the exchange mediums which may be any of the materials such as are commonly employed in base exchange water softeners.

One of the objects of the invention is to provide a brine preparation receptacle of such a character as to permit the preparation of a quantity of brine whose exchange capacity is substantially equal to the exchange capacity of the mineral of the mineral tank.

Another object is to provide for a completely saturated brine without wastage of salt and whereby insoluble substances carried in the salt are prevented from passing over into the exchange bed.

Another object is the provision of a brine preparation receptacle so arranged as to retain the salt in the upper portion of the receptacle in order to produce a completely saturated solution in a more effective and rapid manner.

A more specific object is to provide a brine receptacle located above the upper level of the mineral bed whereby the brine flows into the mineral bed bottom and upwardly through the mineral bed by gravity and displaces water previously occupying the voids of the mineral bed by the difference in specific gravity.

Another object and advantage is to provide a brine preparation receptacle which may be readily added to existing base exchange water softeners.

Other objects and advantages will appear from the following description and accompanying drawing.

In the accompanying drawing:

Fig. 1 is an elevation partly in vertical section of a water softening system in which the principles of my invention are embodied.

Fig. 2 is a fragmentary vertical section on the line 2—2 of Fig. 1.

Fig. 3 is a plan view of a detail.

Fig. 4 is a side elevation of a detail.

Referring to the drawing, 1 represents a tank containing the beds of exchange materials, indicated at 2, which may be zeolites or any of the commonly used base exchange minerals supported on a gravel bed 3. The lower portion of the tank 4 is hopper-shaped in order to provide that the gravel bed will take the form of an inverted cone inasmuch as through this bed the water to be softened is diffused and spread for better travel through the exchange bed. The hard water enters the gravel bed through a nozzle 5 which is connected to a service pipe 6 through piping indicated at 7, so that on actuating the valve 8, the water flows into and rises upwardly through the exchange and gives up to the mineral therein the lime, magnesium or other elements which produce hardness in the water. 9 represents what is known as the free-board above the mineral bed in which softened water is stored after having passed through the mineral bed. The outlet is through the screen 10, this screen serving to prevent mineral grains passing out of the tank since, during the passage of the water through the bed, and the grains are in considerable agitation due to the velocity of the water. 11 is a filler device through which the bed of materials is deposited in the tank upon assembly, and through which the softened water passes on its way to the house pipe, indicated at 12.

When by test the water in the house pipes 12 is seen to be no longer effectively softened, the bed of materials may be regenerated by providing that a quantity of brine is permitted to flow into and submerge the mineral bed. The brine is prepared in a brine receptacle 13 preferably located above the upper level of the mineral bed. The brine receptacle is connected to the hard water supply line as shown, there being a T 14 therein, piping and a valve such as at 15 and 16; the piping 15 being preferably secured into the lower center portion of the receptacle. The brine receptacle is further provided with a sight-glass gauge 17 in order that on opening the valve 16 with the valve 8 open, it may be observed when the water reaches a predetermined desired height in the receptacle, there also being preferably a mark 18 placed on the outer surface of the receptacle for comparison.

The brine receptacle is open at its upper end and extends sufficiently above the desired water level so as to provide ample space for the reception of the salt which is to produce the brine. The salt is usually supplied in fabric bags, and when it is desired to prepare the brine, the salt is placed, without removal from the bag, in the upper portion of the receptacle, it resting on a support such as is indicated in general at 19 in Fig. 3. This support 19 may be of any suitable form but is here shown as being a woven wire basket of comparatively coarse mesh supported on small lugs 20 secured to the inner sides of the receptacle and at such heights as will provide that the water when at the proper level is indicated by the mark 18, will just make contact with the lowermost grains of the mass of salt, whereby as these grains dissolve and thus produce a brine whose specific gravity is greater than water, a downward current is established at the approximate central portion of the receptacle, the direction of this current being indicated by arrows 22. This downwardly flowing brine displaces the fresh water at the lower portion of the receptacle and causes the same to ascend along the sides, eventually reaching the mass of salt and causing further dissolution thereof.

As rapidly as the salt is dissolved in the lower portion of the bag, the salt directly above gravitates in position to be attacked by the brine solution, and, as is well known dissolution goes on until brine reaches a completely saturated point after which no further dissolution takes place. Therefore, there may be and is a direction proportional relation in the amount of salt supplied, to the amount of water contained in the receptacle before direct proceeds and it is obviously a waste of salt to supply more than this given quantity of water may dissolve. By this method, insoluble substances often found in raw salt, such as earth or sand, or substances employed in preventing caking of salt, which are often calcium compounds, are retained by the meshes of the bag and prevented from entering the softener tank.

As previously stated, the quantity of brine produced by the solution of this minimum quantity of salt and the given quantity of water is in direct proportional relation to the mineral bed 2, that is, the quantity of brine would be such as to have an exchange capacity equal to or slightly greater than the exchange capacity of the granular exchange bed, whereby economy in operation is obtained.

In operation, the system is employed in the well known manner in that hard water from the piping 6 is permitted to flow upwardly through the mineral bed 2, thence upwardly into the house piping 12 so long as effective softening is obtained. To regenerate, the valve 23 in the house piping line is closed, and the valve 16 in the piping connected with the solution receptacle 13 is opened allowing fresh water to flow therein until the level of the mark 18 is reached. The measured quantity of salt S in the bag is placed on the basket 19 whereupon brine formation proceeds. When all of the salt has been dissolved, the brine is substantially at its maximum density. The valve 8 is then closed and a valve 24 in a drain pipe is opened, which allows the brine to flow downwardly through the piping 7 and into the mineral bed 2, displacing the water therein by reason of the greater specific gravity.

The action of the brine on the minerals is well known, the coating of lime and magnesium on the individual grains being changed to soluble compounds of calcium and magnesium chlorides permitting the mineral bed to again become alkaline. After sufficient length of time has been allowed for the regenerative process, the valve 16 is closed and the valve 8 in the piping 6 is opened. This is to permit the flushing out of the entire interior of the softener mechanism whereby these soluble compounds and remaining brine is completely ejected and discharged through the piping 25 to any such point of discharge as a sewer. This is allowed to proceed until it is noticed that the water issuing from the piping 25 is soft water. Whereupon the valve 24 is closed and valve 23 is opened to permit the house piping to again be connected to the softening apparatus.

In Fig. 4 a modified form of salt retention means is shown. This consists of a basket formed of fibrous cloth 26, such as cotton cloth, secured to a metallic ring 27 which is hung on lugs 28 arranged about the inner surface of the receptacle 13. This fibrous cloth basket or bag is also preferably supported at the bottom by crossed crossbars 29 which are supported on angle iron lugs 30 secured to the interior of the receptacle 13. The bottom portion of this fibrous cloth basket is supported coincidental with the mark 18 on the receptacle so that when a given minimum quantity of salt is deposited in the basket it will be partially submerged in the water. In employing this modified form of basket, the salt is measured out and placed directly in the basket, the fineness of the meshes of the fibrous cloth being sufficient to retain insoluble solids, or the basket itself may be used as a measuring device, since it may be made in the proper size to contain the correct amount of salt for a brine receptacle of a given capacity.

From the foregoing description, it should be clear that I have provided a simple and efficient means for producing a completely saturated brine solution in a minimum time and that by providing a supply receptacle of definite proportions the quantity of brine is limited only to an amount sufficient to regenerate a given quantity of exchange materials. Further it is evident that a brine supply receptacle of this description may be substituted for other forms of brine receptacles or applied to existing water softeners.

In the process described, flow of brine through the mineral bed is preferably upwardly, this being for the reason that I am enabled to employ a gravity flow water previously occupying the piping and tank interior being displaced by the brine due, by the difference in specific gravity. Further, the calcium and magnesium chlorides are discharged to the sewer and are not permitted to collect in any portion of the softener, such as the gravel beds when the back-wash system is employed.

An important feature of the invention is the straining of the salt solution to remove insoluble substances which are found in salts. The principal insoluble substance in commercial salt is calcium sulphate which if allowed to find its way to the mineral bed with the salt solution acts to deter the salt from performing its proper function as a regenerative medium and shortens the life of the mineral bed by gradually reducing its exchange capacity.

Having thus described my invention, I claim:

1. In a water softening apparatus, a mineral tank having a mineral bed therein, a brine tank above the mineral bed, a pipe leading directly from the bottom of said brine tank to the bottom of said mineral tank, a single water service pipe having a direct connection with said first mentioned pipe at a point between said tanks to supply water directly to said mineral tank, a valve in said water service pipe, and a valve in said other pipe between the brine tank and the point of communication between said pipes, whereby when said valves are open water will flow to the brine tank directly from said service pipe and when said service pipe valve is closed and the other valve open brine will flow from the brine tank to said mineral tank.

2. In a water softening apparatus, a mineral tank having a mineral bed therein, a tank adapted to contain a predetermined amount of water and a quantity of salt sufficient to provide a saturated solution with no appreciable excess of salt, a pipe leading directly from the lower portion of said brine tank to the lower portion of said mineral tank, a water service pipe directly connected with said first-mentioned pipe to supply water directly to said mineral tank, a valve controlling said water service pipe in advance of the point of connection between said pipes, and a valve controlling the brine located in the first-mentioned pipe between the brine tank and the point of connection of said pipes, whereby when both valves are open water may be supplied to the brine tank from the water service pipe, and when the water service pipe valve is closed and the other valve open brine will flow from the brine tank to the mineral tank.

3. In a water softening apparatus, a mineral tank having a mineral bed therein, a brine tank, means for supporting a quantity of salt in said brine tank above the bottom thereof, a strainer for straining the salt solution having a mesh of sufficient fineness to remove from the solution insoluble materials mixed with the salt, a pipe leading directly from the lower portion of said brine tank to the lower portion of said mineral tank, a water service pipe connected directly with said first-mentioned pipe to supply water directly to said mineral tank, a valve for controlling the water supply from said service pipe located in said pipe in advance of the point of connection with the first-mentioned pipe, and a valve in said first-mentioned pipe located between the brine tank and the point of connection between said pipes, whereby when both valves are open water may flow directly from the service pipe to the brine tank and when the service pipe valve is closed and the other valve open brine may flow from the brine tank to the mineral tank.

JOHN H. NASH.